United States Patent
Katz et al.

[15] 3,656,856
[45] Apr. 18, 1972

[54] COLORIMETER

[72] Inventors: George M. Katz, Leonia, N.J.; Arthur L. Levy, Mount Vernon, N.Y.

[73] Assignee: Scientific Specialties Ltd., Garden City, N.Y.

[22] Filed: Mar. 16, 1970

[21] Appl. No.: 19,875

[52] U.S. Cl. .................................356/206, 250/218, 330/59, 356/181
[51] Int. Cl. ..........................................G01n 21/22
[58] Field of Search.............250/209, 218; 330/59; 356/181, 356/206, 246

[56] References Cited

UNITED STATES PATENTS 3,544,798  12/1970  Topol ....................................250/218
3,344,702  10/1967  Wood et al........................250/218 X Primary Examiner—R. L. Wibert
Assistant Examiner—R. J. Webster
Attorney—Kenyon and Kenyon Reilly Carr & Chapin

[57] ABSTRACT

A colorimeter comprising a light source, an operational amplifier, a reference photoconductive cell connected between the input and output of the amplifier and a sample photoconductive cell connected to the input of the amplifier. The amplifier provides an output signal which is a function of the ratio of the amount of light falling on the reference photoconductive cell to the amount of light falling on the saMple photoconductive cell. The output of the amplifier is connected to a suitable measuring device such as a meter or recorder which provides a measurement of the output signal.

27 Claims, 9 Drawing Figures

INVENTORS
ARTHUR L. LEVY
GEORGE M. KATZ

ATTORNEYS

COLORIMETER

BACKGROUND OF THE INVENTION

1. Field of the Invention

This invention relates to colorimeters and more particularly to a new and improved colorimeter which provides a direct readout of transmittance that is unaffected by light fluctuations.

2. Description of the Prior Art

Colorimeters are known for indicating the amount of light reflected from or transmitted through an object, the indication being used to determine some characteristic of the object. For example, colorimeters are widely used in the determination of the concentration of a light absorbing material present in a transparent fluid through which light has been transmitted. One such application is in quantitative chemical analysis and more particularly blood analysis to determine the concentration of a particular material in a solution. In such application, the material under test may inherently exhibit light absorbing power at a specific wavelength, i.e., is colored, or the material may have to be treated with suitable reagents in order to sensitize it to colored light.

In general, in known colorimeters, suitable colored light is transmitted through a container or cuvette containing a solution of the material under test and the light transmitted through the solution is detected by a photosensitive device to which is connected a meter which measures the amount of light transmitted through the solution (transmittance). This measurement, in turn, may be used to determine the concentration of the light absorbing material under test. In one type of known colorimeter, a single photovoltaic cell is used as the light detector. The use of a single photovoltaic cell is disadvantageous in that a large light source must be provided due to the insensitivity of such cells. This requires the use of a large power supply for the light source and a large and bulky condenser system. In addition, any fluctuation in the intensity of the light source will cause false readings of concentration, thus necessitating the use of a heavy and bulky constant power supply, such as a battery or constant voltage transformer for the light source.

Another known colorimeter, makes use of a pair of photovoltaic cells connected in a Wheatstone Bridge configuration, to mitigate light fluctuations in the light source. One cell is a reference cell and receives light directly from the light source whereas the second cell is a sample cell and receives light transmitted through the test sample. A meter is connected across the output terminals of the Bridge and measures any imbalance caused by less light falling on the sample cell due to light absorption by the material under test. A variable potentiometer connected in one of the bridge legs is then adjusted to null the meter, the change in resistance being a measurement of the transmittance of the test solution and consequently of the concentration of the light absorbing material. Since photovoltaic cells are used in this type of colorimeter, a large light source (and large power supply therefor) and bulky optical condensing system must be provided in order to activate the insensitive cells. In addition, a direct reading is not provided and a reading is only obtained through manipulation of a potentiometer. The low output of the photovoltaic cells is also disadvantageous.

Although, it has been proposed to use photoconductive devices in colorimeters, where only a single photoconductor is used, it will be sensitive to light fluctuations thus necessitating use of a constant power source. Where the use of two photoconductive devices in a bridge configuration has been proposed, the necessity of using a nulling potentiometer or the like unnecessarily complicates the device and makes it inconvenient. In addition, the output of the bridge may not be used directly for use in conjunction with other devices such as computers or the like.

OBJECTS OF THE INVENTION

It is therefore an object of the present invention to provide a new and improved colorimeter which produces a direct readout of transmittance that is unaffected by light fluctuations.

It is a further object of the present invention to provide a colorimeter which utilizes a low level light source and minimal optical system, which has a low level power supply and operates at a low heat level with a minimum warm-up time and which produces a high level output which may be used directly with recorders, computers and the like.

It is still another object of the present invention to provide a compact, efficient and simply operated colorimeter which may be used to provide measurement of the transmittance or optical density of a solution contained in a single cuvette or provide continuous measurement of transmittance or optical density of a solution flowed through a conventional flow cell.

It is yet another object of the present invention to provide a new and improved colorimeter which is readily adapted to provide differential colorimetric measurements or expanded scale measurements.

It is still a further object of the present invention to provide a new and improved colorimeter which is adapted to produce a read out of reflected or transmitted light.

SUMMARY OF THE INVENTION

These and other objects and advantages are provided by the present invention which generally comprises an operational amplifier having a reference photoconductive cell connected between the input and output of the amplifier and a sample photoconductive cell connected to the input of the amplifier. According to one aspect of the invention light from a light source is reflected from or transmitted through an object onto the sample cell and is caused to fall directly on the reference cell. The output from the amplifier provides a direct measurement of reflectance or transmittance and may be indicated by a meter or recorder. According to another aspect of the invention a direct readout of optical density may be obtained by means of a logarithmic amplifier connected between the operational amplifier and meter or recorder.

According to still another aspect of the present invention, differential measurements of transmittance may be obtained by passing light from a light source through two cuvettes or flow cells having different concentrations of solution respectively onto the reference cell and onto the sample cell.

Scale expansion is provided according to another aspect of the invention through calibration of the meter by means of cuvettes having solutions of known concentrations.

BRIEF DESCRIPTIONS OF THE DRAWINGS

Other and further objects and advantages of the present invention will be evident from the following detailed description of the invention and from the drawings wherein.

DESCRIPTION OF THE EMBODIMENTS

Figure 1:
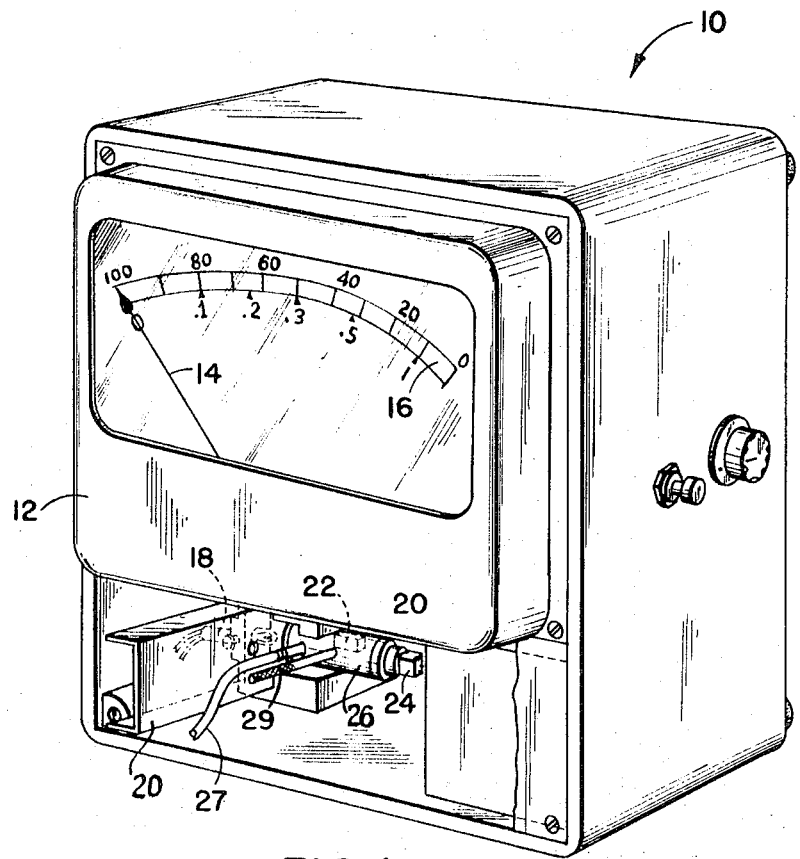
FIG. 1 is a perspective view showing one physical arrangement of some of the components of the apparatus of the present invention.

Referring now more particularly to FIG. 1, there is shown one apparatus embodying the present invention. As shown, housing 10, supports in the upper portion thereof, a meter 12 having an indicator 14 and a scale 16. Positioned within the lower portion of housing 10 is a light source 18 mounted on bracket 20 secured to housing 10. Light source 18 may be any suitable miniature bulb which emits light over a broad spectrum of wavelengths.

Mounted opposite light source 18 are reference photoconductive cell 22 and sample photoconductive cell 24. Photoconductive cells 22 and 24 are photosensitive devices having resistances which vary as a function of the amount of light impinging thereon. Cell 24 is shown as mounted at the rear of fluid flow cell 26 having respective inlet and outlet tubes 27 and 29 connected thereto. Flow cell 26 comprises an internal chamber through which fluid is flowed and has transparent front and rear walls to allow transmission of light from source 18 to cell 24 through the chamber.

Not shown is a filter hereinafter to be described which is normally positioned between source 18 and cell 26.

Figure 2:
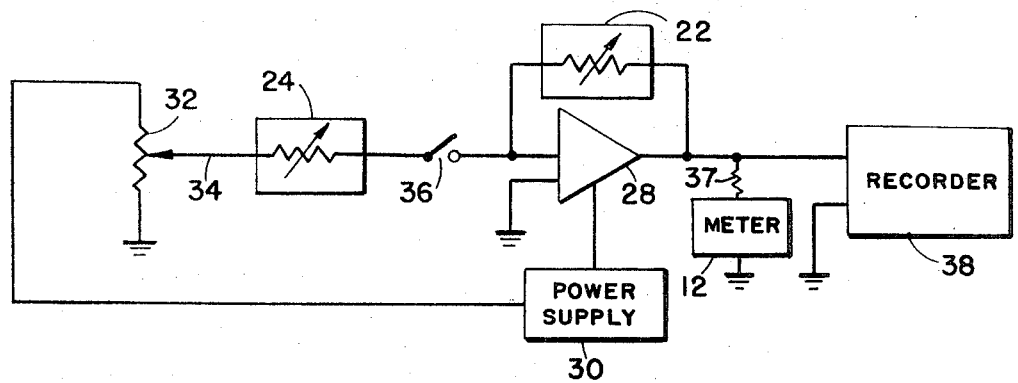
FIG. 2 is a schematic diagram of one embodiment of the present invention.

Referring now to FIG. 2, there is shown adapted one preferred embodiment of the present invention.

As shown, reference cell 22 is connected across the input and output of operational amplifier 28 and sample cell 24 is connected to the input of amplifier 28. Operational amplifiers are well known in the art and generally comprise a high gain d.c. amplifier such as that shown and described at pages 544 – 546 of Servomechanisms and Regulating System Design, (2nd ed.) Vol. 1 by Harold Chestnut and Robert W. Mayer, published by John Wiley & Sons, Inc., New York.

Power supply 30 is connected to amplifier 28 and supplies power thereto and is also connected to variable resistor 32 having wiper arm 34. A switch 36 is connected between cell 24 and the input to amplifier. Meter 12 having limiting resistor 37 in series therewith and recorder 38 are provided to measure the output of amplifier 28. Any suitable meter or recorder well known to those skilled in the art may be provided for meter 12 and recorder 38.

Figure 4:
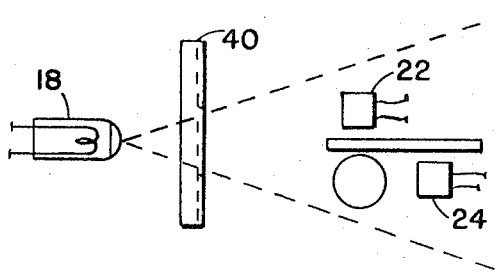
FIGS. 4, 5 and 6 are diagrammatic views showing preferred arrangements of the light source and photoconductive cells as used in the present invention when measuring transmittance.
Figure 5:
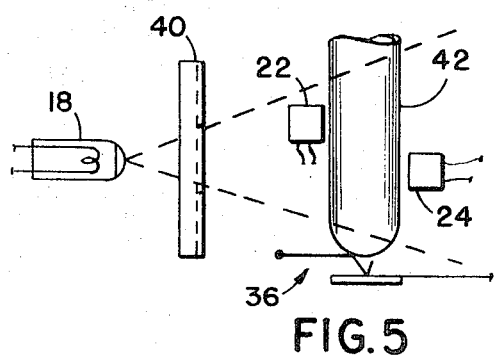
Figure 6:
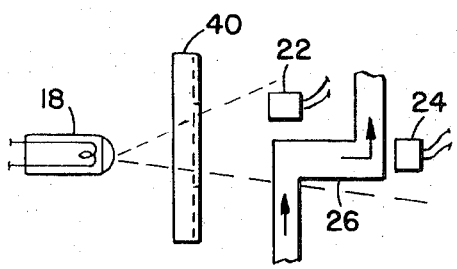

Referring now to FIGS. 4, 5 and 6 there are shown preferred arrangements of cells 22 and 24 for measuring the transmittance of a fluid containing a light absorbant material whose concentration is to be determined. FIG. 4 shows light source positioned on one side of filter 40. Filter 40 preferably passes light of a very narrow band of selected wavelengths, the selected wavelength band being dependent upon the band of light which is optimally absorbed by the material under test.

The light absorbant material whose concentration is to be determined is contained in a transparent container or cuvette 42 as shown in FIG. 5 or is flowed through a flow cell 26 as shown in FIG. 6. The filtered light from filter 40 falls directly on reference photoconductive cell 22 but is transmitted through the fluid in cuvette 42 or flow cell 26 before it falls on photoconductive cell 24.

The operation of the embodiment of FIG. 2 using the arrangement of FIG. 4 and 5 will now be described. With no cuvette 42 inserted, normally open switch 36 will be open and act as if a very high resistance were applied to the input of amplifier 28. The reading of meter 12 will be zero corresponding to zero transmission and zero illumination falling on sample cell 22. Cuvette 42 is now filled with a transparent solution such as water, solvent or reagent with no light absorbing material present in the solution. Cuvette 42 is caused to close switch 36 and wiper 34 of resistor 32 is adjusted so that meter 12 reads full scale representing 100% transmission. Cuvette 42 is then replaced with another cuvette 42 containing the light absorbant material in solution. Since the output from amplifier 28 is a function of the ratio of the resistance of cell 22 to the resistance of cell 24 which in turn is a function of the amount of light falling on cell 22 to the amount of light falling on cell 24, it will provide a direct measurement of the percent transmittance of the solution under test. Meter 12 will therefore read directly the percent transmittance of the solution in cuvette 42. This reading may be then converted to the concentration of the light absorbing material in the solution by well known procedures which are dependent upon the material under test.

Recorder 38 will also record on a chart the value shown by meter 12.

Where as shown in FIG. 6, flow meter 26 is used, switch 36 must be manually operated. In such case, the opening of switch 36 will produce a zero reading on meter 12 as heretofore described. This may also be accomplished by preventing light from falling on cells 22 and 24, by obstructing the light path from source 18. A clear solution is then flowed through cell 26 and resistor 32 adjusted to obtain a 100 percent reading on the meter. If a solution containing light absorbant material is now flowed through cell 26, meter 12 will give a reading of the percent transmittance of the solution and recorder 38 will give a continuous recording thereof.

Figure 3:
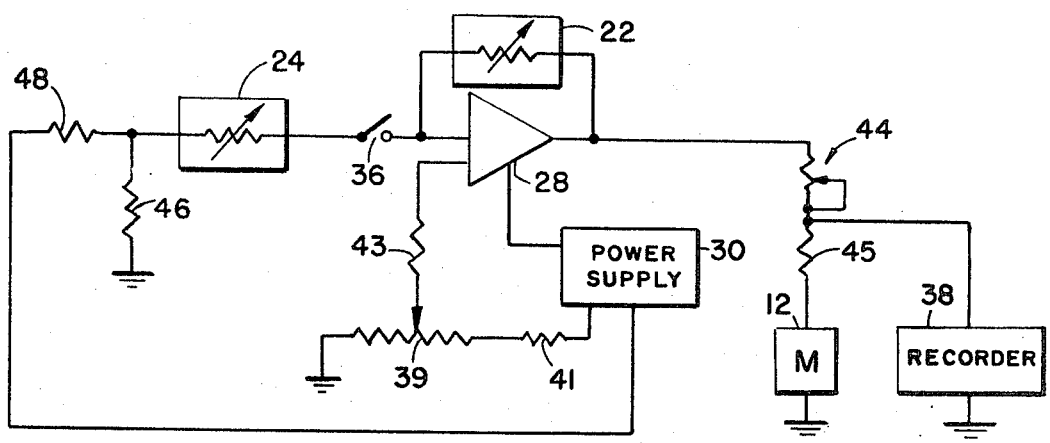
FIG. 3 is a schematic diagram of another embodiment of the present invention.

Referring now to FIG. 3 there is shown another embodiment of the present invention. As shown, cell 22 is connected between the input and output of amplifier 28 and cell 24 is connected to the input of amplifier 28 through switch 36. A variable voltage is also applied as a second input to amplifier 28 from power supply 30 by means of fixed resistor 41, variable resistor 39 and fixed resistor 43. Meter 12 and recorder 38 are connected to the output of amplifier 28 by means of variable resistor 44. Current limiting resistor 45 is also provided in series with meter 12. Cell 24 is also connected to supply 30 by means of a voltage divider network comprising fixed resistors 46 and 48.

In operation, a cuvette 42 containing a clear solution is positioned in front of filter 40 and caused to close switch 36. Resistor 39 is adjusted so that the meter reads 0, which corresponds to 100 percent transmission. Switch 36 is now opened and resistor 44 adjusted to read full scale which represents 0 transmission. Cuvette 42 containing a solution of color absorbant material under test is now inserted to close switch 36. Meter 12 will now read the percent transmission which can also be recorded by recorder 38.

Following are specific values of components which may be used in the circuit of FIG. 3. These values are given by way of illustration only and are not to be considered limiting the scope of the present invention.

COMPONENT VALUES

| | | |
|---|---|---|
| 22 - photoconductive cell | Clairex 905HL | |
| 24 - photoconductive cell | Clairex 705HL | |
| 41 - fixed resistor | ohms | 2.7K |
| 39 - variable resistor | ohms | 1.5K |
| 43 - fixed resistor | ohms | 470K |
| 44 - variable resistor | ohms | 5K |
| 45 - fixed resistor | ohms | 1.5K |
| 46 - fixed resistor | ohms | 1K |
| 48 - fixed resistor | ohms | 2.2K |

Meter 12, recorder 38, power supply 30 and operational amplifier 28 respectively may be of any suitable type or configuration well known to those skilled in the art and therefore will not be described in detail.

Where it is desirable to have meter 12 and/or recorder 38 indicate an expanded scale of values, the circuit of FIG. 3 may be utilized. If, for example, it is desired to have a range of 80 – 100 percent transmittance displayed over the full scale of meter 12, the circuit of FIG. 3 is calibrated by first inserting a cuvette containing a solution with 100 percent transmittance to close switch 36 and adjusting resistor 39 so that the current through meter 12 is zero and the scale reads 100 percent. A cuvette containing a solution with 80 percent transmittance is then inserted and resistor 44 adjusted so that meter 12 indicates full scale which corresponds to 80 percent transmittance.

Figure 7:
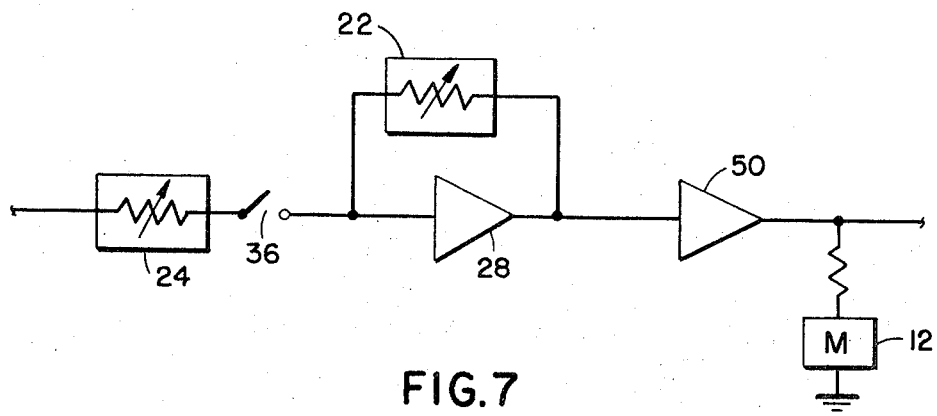
FIG. 7 is a schematic diagram of yet another embodiment of the present invention.

Referring now to FIG. 7 there is shown an embodiment of the present invention wherein optical density may be read directly on meter 12. As shown, reference photoconductive cell 22 and sample photoconductive cell 24 are respectively connected between the input and output of amplifier 28 and to the input of amplifier 28. A logarithmic amplifier 50 is connected to the output of amplifier 28 and produces an output signal which is the logarithm of the output signal from amplifier 28. If the solution under test satisfies Beer's law, meter 12 will give a direct reading which is proportional to the concentration of the solution.

Figure 8:
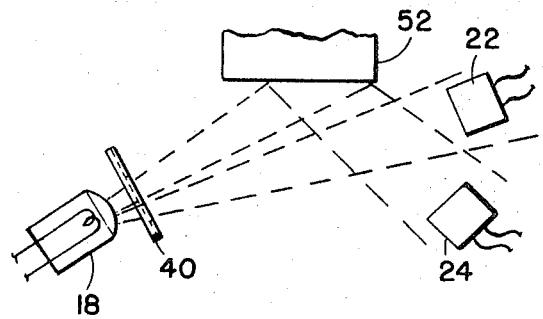
FIG. 8 is a diagrammatic view showing one arrangement of the light source and photoconductive cells as used in the present invention when measuring reflectance.

In certain applications, it is desirable to measure the light reflected from an object, such as a turbid fluid, in order to determine some quality or characteristic thereof. The arrangement shown in FIG. 8 may be used according to the present invention to provide a measurement of reflected light or reflectance. As shown, a container 52 holding a material under test, has light from light source 18 filtered by filter 40, reflected from the lower surface thereof onto sample photoconductive cell 24. Reference photoconductive cell 22 is also provided and detects direct light radiated from source 18 through filter 40. It will be understood that any suitable circuit arrangement such as those of FIGS. 2 or 3 may be used to indicate reflectance.

Figure 9:
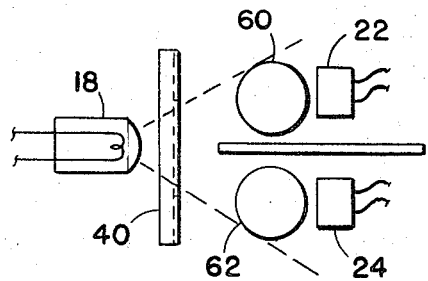
FIG. 9 is one arrangement of the light source and photoconductive cells for use in a differential colorimeter according to the present invention.

Referring now to FIG. 9, there is shown an arrangement of cells 22 and 24 which may be used in the colorimeter of the present invention for determining the difference in transmittance between two solutions. As shown, cuvettes 60 and 62 containing solutions of light absorbant material of different concentrations are respectively positioned in front of cells 22 and 24. Radiated light from light source 18 is filtered by filter 40 and transmitted through cuvettes 60 and 62. Where cells 22 and 24 are connected in a circuit according to the present invention, for example, in the circuits of FIGS. 2 or 3, the measuring device, such as meter 12 or recorder 38 will give an indication of the difference in transmittance of the solutions contained in cuvettes 60 and 62.

Although the embodiments of the present invention hereinabove have been generally described in the determination of the transmittance or reflectance of a solution of light absorbant material, it will be understood that the colorimeter of the present invention may be used in the determination of transmittance of any translucent or transparent object, whether solid or fluid such as gas or liquid, and of the reflectance of any object which reflects light, whether solid or fluid.

In addition, the term "light" as used herein is not to be limited to visible light, but also includes the spectrum of radiated energy which may be detected by photoconductive cells. For example, non-visible radiant energy in the ultraviolet and infrared wavelengths are also considered to be within the term "light."

It will also be understood that although in many applications it is desirable that radiant energy of a specific wavelength or narrow band of wavelengths be used, the colorimeter of the present invention may also be used in conjunction with radiant energy of a broad band of wavelengths, for example with ordinary daylight. Any suitable light source may be used and where colored light is to be used, it may be obtained by using a light source which radiates the desired colored light or by using a source of white light and filtering such light to produce the desired colored light. Generally, the photoconductive cells will be chosen to be responsive to the desired light chosen.

According to the present invention, the output signal of the colorimeter may be used directly as the input to any suitable device such as the meter and recorder mentioned hereinabove or to devices such as concentration computers, scale expanders and other measuring and computing devices.

What is claimed is:

1. A colorimeter for analyzing a given sample by producing an output voltage which is a direct measurement of the concentration of the sample, comprising:
   a. container means for holding the sample to be analyzed;
   b. a source of radiant energy positioned on one side of the sample to be analyzed;
   c. a reference photoconductive cell positioned between the source of radiant energy and the sample, said photoconductive cell having a resistance which varies as a function of the radiant energy impinging thereon;
   d. a sample photoconductive cell positioned on the opposite side of the sample from the light source, said photoconductive cell having a resistance which varies as a function of the light which reaches said sample photoconductive cell after passing through the sample;
   e. amplifier means having an input and an output, said sample photoconductive cell being electrically connected to the input of the amplifier means and said reference photoconductive cell being electrically connected across the input and output of the amplifier means, the output of said amplifier being a function of the ratio of the intensity of radiant energy directed onto said reference photoconductive cell to the intensity of radiant energy directed onto said sample photoconductive cell;
   f. measuring means connected to the output of said amplifier means;
   g. a filter positioned between the source of radiant energy on one side of the filter and the reference photoconductive cell, sample containing means, and sample photoconductive cell on the opposite side of the filter; and
   h. a housing to contain the source of radiant energy, reference photoconductive cell, sample containing means, sample photoconductive cell, amplifier means, measuring means and filter;
   i. wherein the radiant energy from said source of radiant energy falls directly on said reference photoconductive cell, but is transmitted through the sample to be analyzed before said radiant energy falls on said sample photoconductive cell.

2. The colorimeter of claim 1 wherein the amplifier means is a high gain dc operational amplifier.

3. The colorimeter of claim 1 wherein said measuring means is a meter.

4. The colorimeter of claim 1 further comprising a logarithmic amplifier which is connected between the output of said amplifier means and said meter to produce an output which is the logarithm of the output of said amplifier means to give a direct reading of optical density on said meter.

5. The colorimeter of claim 1 wherein said measuring means is a recorder.

6. The colorimeter of claim 1 wherein said measuring means comprises a meter and a recorder, both being connected to the output of said amplifier means.

7. The colorimeter of claim 6 further comprising a source of variable voltage which is applied as an input to said amplifier means to enable an expanded scale of values to be displayed on said meter.

8. The colorimeter of claim 7 wherein said source of variable voltage comprises a source of fixed voltage and variable resistance connected across said source of fixed voltage and connected to the input of said amplifier means.

9. The colorimeter of claim 1 wherein the container means for holding the sample to be analyzed is a transparent cuvette.

10. The colorimeter of claim 9 further comprising a switch which is positioned in the electrical circuit between the sample photoconductive cell and said amplifier means, said switch being normally open and said switch being adapted to be closed by said cuvette.

11. The colorimeter of claim 1 wherein the container means for holding the sample to be analyzed is a fluid flow cell.

12. A colorimeter for determining the quantitative difference in transmittance between two solutions, comprising:
   a. two container means, one for holding each of the two solutions;
   b. a source of radiant energy positioned on one side of the two solutions to be analyzed;
   c. a reference photoconductive cell positioned adjacent to the first of the two solutions to be analyzed and positioned on the opposite side of said solution from the source of radiant energy, said photoconductive cell having a resistance which varies as a function of the radiant energy impinging thereon;
d. a sample photoconductive cell positioned adjacent to the second of the two solutions to be analyzed and positioned on the opposite side of said solution from said source of radiant energy, said photoconductive cell having a resistance which varies as a function of the radiant energy impinging thereon:
e. amplifier means having an input and output, said sample photoconductive cell being electrically connected to the input of said amplifier means and said reference photoconductive cell being electrically connected across the input and output of said amplifier means;
f. a measuring means connected to the output of said amplifier to indicate the difference in transmittance of the two solutions:
g. a filter positioned between the source of radiant energy and the two solutions to be analyzed; and
h. a housing to contain the source of radiant energy, the two samples to be analyzed, the reference photoconductive cell, the sample photoconductive cell, the amplifier means, the measuring means and the filter;
i. wherein radiant energy from said source of radiant energy is transmitted through the first of the two solutions to be analyzed onto said reference photoconductive cell and radiant energy from said source of radiant energy is transmitted through the second of the two solutions to be analyzed onto said sample photoconductive cell.

13. The colorimeter of claim 12 wherein the amplifier means is a high gain dc amplifier.

14. The colorimeter of claim 12 wherein the measuring means is a meter.

15. The colorimeter of claim 12 wherein a logarithmic amplifier is connected to the output of said amplifier means to produce which is the logarithm of the output of said amplifier means to give a direct reading of optical density on said meter.

16. The colorimeter of claim 12 wherein said measuring means is a recorder.

17. The colorimeter of claim 12 wherein said measuring means comprises a meter and a recorder, both being connected to the output of said amplifier means.

18. The colorimeter of claim 12 wherein the container means for holding each of the solutions is a transparent cuvette.

19. The colorimeter of claim 12 wherein the container means for holding each of the solutions is a fluid flow cell.

20. A colorimeter for analyzing a given sample by measuring the light reflected from the sample, comprising:
a. container means for holding the sample to be analyzed;
b. a source of radiant energy positioned on one side of the sample to be analyzed to emit a light on the sample;
c. a reference photoconductive cell positioned adjacent to the source of radiant energy to receive radiant energy directly from said source, said photoconductive cell having a resistance which varies as a function of the light impinging thereon from the light source;
d. a sample photoconductive cell positioned adjacent to the source of radiant energy and adjacent to the sample to be analyzed to receive radiant energy reflected from the sample, said photoconductive cell having a resistance which varies as a function of the light which reaches said sample photoconductive cell after passing through the sample;
e. amplifier means having an input and an output, the sample photoconductive cell being electrically connected to the input of the amplifier means and the reference photoconductive cell being electrically connected across the input and output of the amplifier means, the output of said amplifier being a function of the ratio of the intensity of radiant energy directed onto said reference photoconductive cell to the intensity of radiant energy directed onto said sample photoconductive cell;
f. measuring means for measuring the output of said amplifier means;
g. a filter positioned between the source of radiant energy on one side of the filter and the reference photoconductive cell, sample containing means, and sample photoconductive cell on the opposite side of the filter; and
h. a housing to contain the light source, reference photoconductive cell, sample containing means, amplifier means, measuring means and filter.

21. The colorimeter of claim 20 wherein the amplifier means is a high gain dc operational amplifier.

22. The colorimeter of claim 20 wherein said measuring means is a meter.

23. The colorimeter of claim 20 wherein a logarithmic amplifier is connected to the output of said amplifier means to produce an output which is a logarithm of the output of said amplifier means to give a direct reading of optical density on said meter.

24. The colorimeter of claim 20 wherein said measuring means is a recorder.

25. The colorimeter of claim 20 wherein said measuring means comprises a meter and a recorder, both being connected to the output of said amplifier means.

26. The colorimeter of claim 20 wherein the container means for holding the sample to be analyzed is a transparent cuvette.

27. The colorimeter of claim 20 wherein the container means for holding the sample to be analyzed is a fluid flow cell.

* * * * *

UNITED STATES PATENT OFFICE
CERTIFICATE OF CORRECTION

Patent No. 3,656,856    Dated April 18, 1972

Inventor(s) Katz et al.

It is certified that error appears in the above-identified patent and that said Letters Patent are hereby corrected as shown below:

In the Abstract

Line 7, "saMple" should be --sample--

Line 10, after "a measurement of the output signal." insert:
--In one embodiment a cuvette containing or a flow cell passing a solution of light absorbing material is positioned between the light source and the sample photoconductive cell. The output from the operational amplifier is measured by the measuring device as per cent transmittance of the solution. In a modification, a logarithmic amplifier is connected to the operational amplifier and the output from the logarithmic amplifier is measured by the measuring device as optical density. In another embodiment, cuvettes containing solutions of different concentrations are respectively positioned between the light source and the reference and sample photoconductive cells, the output from the amplifier providing a differential measurement of transmittance.--

In the Specification

Column 3, line 24: "shown adapted" should be --schematically shown--

Signed and sealed this 8th day of August 1972.

(SEAL)
Attest:

EDWARD M. FLETCHER, JR.
Attesting Officer

ROBERT GOTTSCHALK
Commissioner of Patents